US009120355B2

(12) United States Patent
Hada (10) Patent No.: US 9,120,355 B2
(45) Date of Patent: Sep. 1, 2015

(54) PNEUMATIC TIRE

(71) Applicant: Sumitomo Rubber Industries, Ltd., Kobe-shi, Hyogo (JP)

(72) Inventor: Yoshihiro Hada, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 294 days.

(21) Appl. No.: 13/713,455

(22) Filed: Dec. 13, 2012

(65) Prior Publication Data

US 2013/0167995 A1 Jul. 4, 2013

(30) Foreign Application Priority Data

Dec. 28, 2011 (JP) ................... 2011-289680

(51) Int. Cl.
| | |
|---|---|
| *B60C 11/11* | (2006.01) |
| *B60C 11/03* | (2006.01) |
| *B60C 11/12* | (2006.01) |
| *B60C 11/13* | (2006.01) |

(52) U.S. Cl.
CPC ........... *B60C 11/032* (2013.04); *B60C 11/0304* (2013.04); *B60C 11/0306* (2013.04); *B60C 11/1369* (2013.04); *B60C 2011/0348* (2013.04); *B60C 2011/0353* (2013.04); *B60C 2011/0369* (2013.04); *B60C 2011/0388* (2013.04)

(58) Field of Classification Search
CPC B60C 11/0302; B60C 11/0304; B60C 11/11; B60C 11/0306; B60C 11/1369; B60C 2011/0353; B60C 2011/0369; B60C 2011/0348; B60C 2011/0388
USPC ............. 152/209.8–209.9, 209.18, 902–903, 152/DIG. 3, 209.22
See application file for complete search history.

(56) References Cited

U.S. PATENT DOCUMENTS

| | | | | |
|---|---|---|---|---|
| 5,200,008 | A * | 4/1993 | Enterline et al. ........... | 156/110.1 |
| 5,293,918 | A * | 3/1994 | Tsuda et al. ............... | 152/209.8 |
| 5,407,005 | A * | 4/1995 | Consolacion et al. ..... | 152/209.9 |
| 6,626,215 | B2 * | 9/2003 | Ikeda ....................... | 152/209.18 |
| D481,354 | S * | 10/2003 | Hutz et al. .................. | D12/601 |
| 7,434,606 | B2 * | 10/2008 | Miyabe et al. ............. | 152/209.2 |
| 2008/0000564 | A1 | 1/2008 | Mukai | |

FOREIGN PATENT DOCUMENTS

JP 2008-6987 A 1/2008

* cited by examiner

*Primary Examiner* — Steven D Maki
*Assistant Examiner* — Kendra Ly
(74) *Attorney, Agent, or Firm* — Birch, Stewart, Kolasch & Birch, LLP (57) ABSTRACT

A pneumatic tire comprises: a tread portion with an inboard and an outboard tread edges; a pair of inboard and outboard center main grooves to define a center portion therebetween; a pair of inboard and outboard shoulder main grooves; an inboard middle portion between the inboard center and shoulder main grooves; an outboard middle portion between the outboard center and shoulder main grooves; an inboard shoulder portion defined the axially outside of the inboard shoulder main groove; an outboard shoulder portion defined the axially outside of the outboard shoulder main groove; the outboard shoulder main groove with a groove width smaller than those of other main grooves; the outboard middle portion having a width larger than that of the inboard middle portion; and a plurality of outboard shoulder lateral grooves each extending from the outboard tread edge to its inner end terminating on the outboard middle portion.

20 Claims, 4 Drawing Sheets

PNEUMATIC TIRE

BACKGROUND OF THE INVENTION

1. Field of the Invention

The present invention relates to a pneumatic tire in which the steering stability and uneven wear resistance can be improved while maintaining the drainage performance.

2. Description of the Related Art

In order to improve the steering stability and uneven wear resistance, a pneumatic tire having a tread portion with high rigidity by increasing its land ratio is proposed. Especially, as for the pneumatic tire having an installing direction to a vehicle, it is profitable to increase the land ratio in the outboard tread portion which is applied large side force at cornering.

However, when the land ratio in the outboard tread portion is too large, the drainage performance in the outboard tread portion tends to decrease due to small volume of grooves. Accordingly, there is still room for improvement in the method described above.

SUMMARY OF THE INVENTION

The present invention has been worked out in light of the circumstances described above, and has a main object of providing a pneumatic tire in which the steering stability and uneven wear resistance can be improved while maintaining the drainage performance.

In accordance with the present invention, there is provided a pneumatic tire having a specified installing direction to a vehicle, which comprises: a tread portion having an inboard tread edge and an outboard tread edge; a pair of circumferentially extending inboard and outboard center main grooves disposed both sides of a tire equator to define a center portion therebetween; a pair of circumferentially extending inboard and outboard shoulder main grooves disposed axially outside of the inboard and outboard center main grooves; a pair of middle portions which include an inboard middle portion defined between the inboard center main groove and the inboard shoulder main groove and an outboard middle portion defined between the outboard center main groove and the outboard shoulder main groove; a pair of shoulder portions which include an inboard shoulder portion defined the axially outside of the inboard shoulder main groove and an outboard shoulder portion defined the axially outside of the outboard shoulder main groove; the outboard shoulder main groove having a groove width smaller than those of the inboard shoulder main groove and center main grooves; the outboard middle portion having a width larger than that of the inboard middle portion; a plurality of outboard shoulder lateral grooves each of which extends from the outboard tread edge toward the tire equator beyond the outboard shoulder main groove so as to have axially inner end on the outboard middle portion; a plurality of outboard middle lateral grooves each of which has an outboard end on the outboard middle portion and an inboard end on the center portion; each said inner end of the outboard shoulder lateral groove provided in different position in the circumferential direction of the tire with respect to each said outboard end of the outboard middle lateral groove; and a plurality of outboard middle narrow grooves each of which has a groove width smaller than those of said lateral grooves and connects between the inner end of the outboard shoulder lateral groove and the outboard end of the outboard middle lateral groove.

In this application including specification and claims, various dimensions, positions and the like of the tire refer to those under a normally inflated unloaded condition of the tire unless otherwise noted. The normally inflated unloaded condition is such that the tire is mounted on a standard wheel rim and is inflated to a standard pressure but loaded with no tire load.

The standard wheel rim is a wheel rim officially approved or recommended for the tire by standards organizations, the standard wheel rim is the "standard rim" specified in JATMA, the "measuring Rim" in ETRTO, the "Design Rim" in TRA or the like, for example.

The standard pressure is the "maximum air pressure" in JATMA, the "Inflation Pressure" in ETRTO, and the maximum pressure given in the "Tire Load Limits at various Cold Inflation Pressures" table in TRA or the like. In case of passenger car tires, however, the standard pressure is uniformly defined by 180 kPa.

DETAILED DESCRIPTION

An embodiment of the present invention will be explained below with reference to the accompanying drawings.

Figure 1:
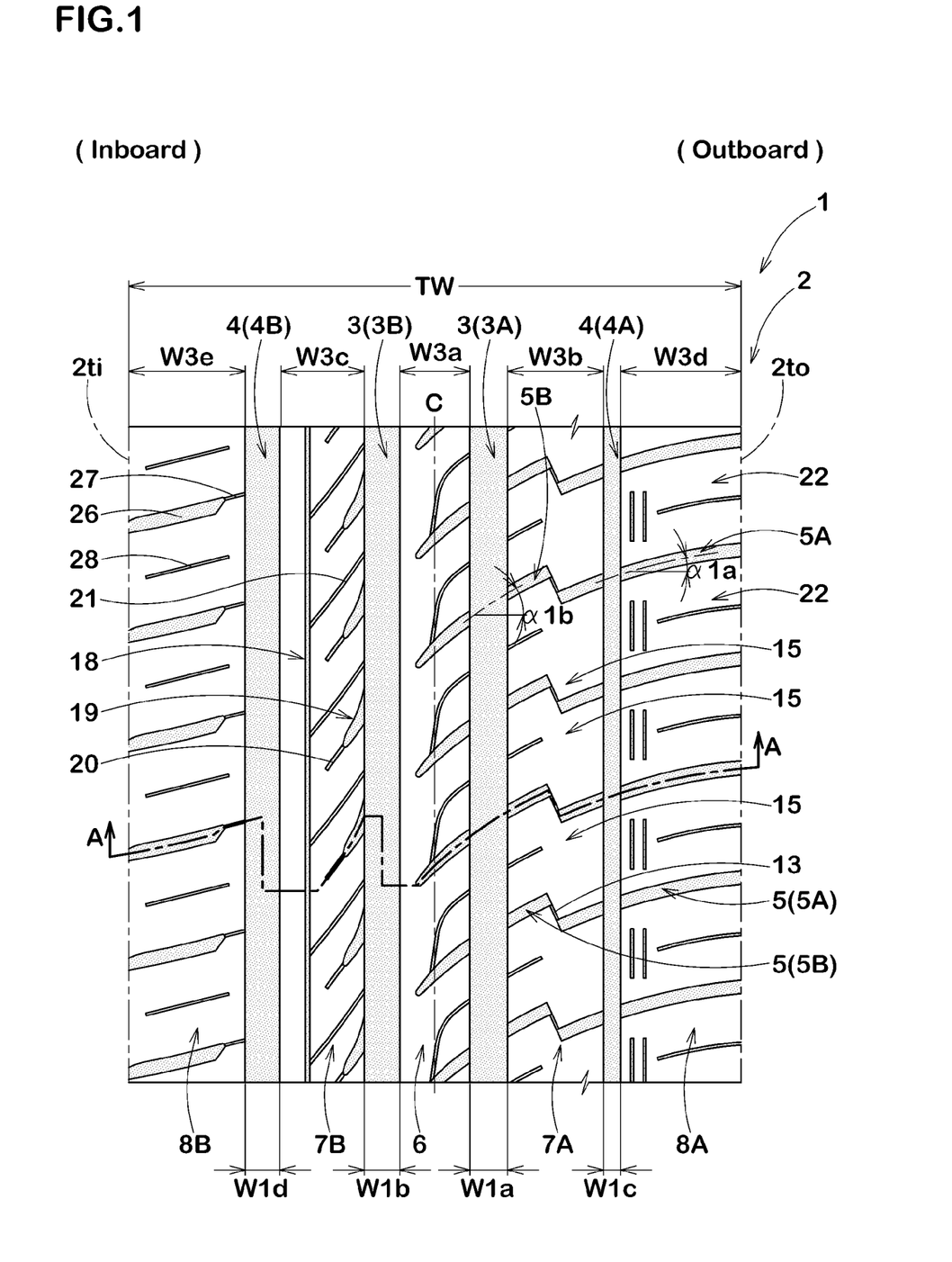
FIG. 1 is a development view of a tread portion of a pneumatic tire showing an embodiment of the present invention.

As shown in FIG. 1, a pneumatic tire (hereinafter it may simply be referred as "the tire") 1 in accordance with the present invention has a specified installing direction to a vehicle. The installing direction may be provided on the sidewall portion of the tire 1, for example.

The tire includes a tread portion 2 with a left-right asymmetry tread pattern including an inboard tread edge 2*ti* and an outboard tread edge 2*to* defining a tread width TW therebetween. The tread edges 2*to* and 2*ti* are the axial outermost edges of the ground contacting patch which occurs under the normally inflated loaded condition when the camber angle of the tire is zero. The normally inflated loaded condition is such that the tire is mounted on the standard wheel rim and inflated to the standard pressure and loaded with the standard tire load. Moreover, the standard load is the "maximum load capacity" in JATMA, the "Load Capacity" in ETRTO, and the maximum value given in the above-mentioned table in TRA or the like.

The inboard tread edge 2*ti* refers to one of the two tread edges which is intended to be positioned towards the center of the vehicle body. The outboard tread edge 2*to* refers to the other tread edge which is intended to be positioned away from the center of the vehicle body. According thereto, in this application, the terms "outboard" and "inboard" are used toward the outboard tread edge 2*to* and inboard tread edge 2*ti*, respectively, to refer relative positions in the tire axial direction.

The terms "axially inner", "axially inward" and the like are used toward the tire equator C, and the terms "axially outer", "axially outward" and the like are used toward the tread edge in order to refer relative positions in the tire axial direction.

The tread portion 2 of the pneumatic tire 1 is provided with a pair of circumferentially extending center main grooves 3 disposed both sides of the tire equator C, and a pair of circumferentially extending shoulder main grooves 4 disposed the axially outside of center main grooves 3. Moreover, the tread portion 2 is provided with a plurality of lateral grooves 5 extending in directions crossing main grooves 3 and 4.

The center main grooves 3 include: an outboard center main groove 3A which is disposed in the side of the outboard tread edge 2to than the tire equator C; and an inboard center main groove 3B which is disposed in the side of the inboard tread edge 2ti than the tire equator c. Also, the shoulder main grooves 4 include: an outboard shoulder main groove 4A which is disposed in the side of the outboard tread edge 2to than the outboard center main groove 3A; and an inboard shoulder main groove 4B which is disposed in the side of the inboard tread edge 2ti than the inboard center main groove 3B.

Hence, the tread portion 2 includes: a center portion 6 between the outboard and inboard center main grooves 3A and 3B; an outboard middle portion 7A defined between the outboard center main groove 3A and the outboard shoulder main groove 4A; an inboard middle portion 7B defined between the inboard center main groove 3B and the inboard shoulder main groove 4B; an outboard shoulder portion 8A defined between the outboard shoulder main groove 4A and the outboard tread edge 2to; and an inboard shoulder portion 8B defined between the inboard shoulder main groove 4B and the inboard tread edge 2ti.

Figure 2:
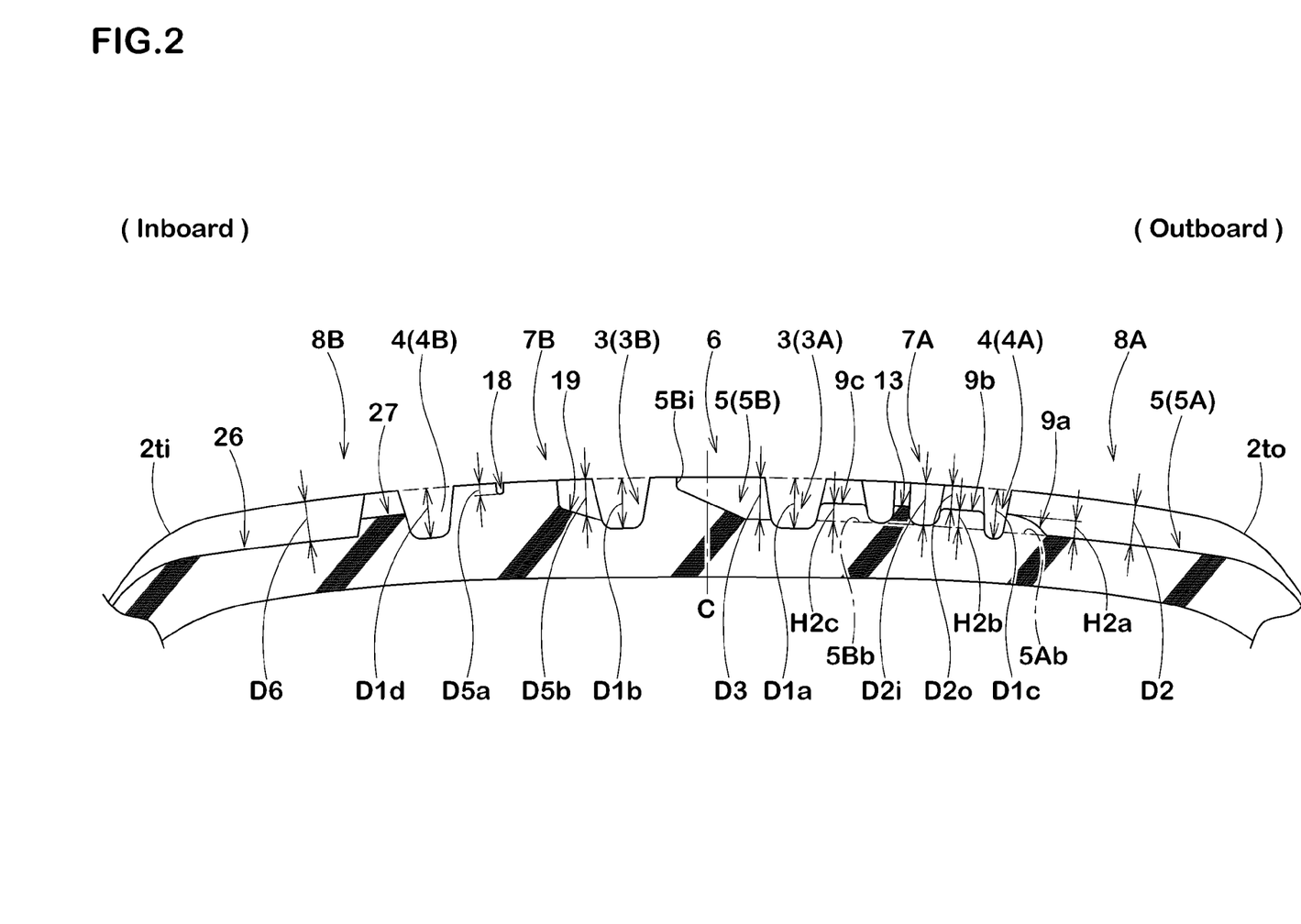
FIG. 2 is a cross sectional view taken along the line A-A Of FIG. 1.

Each of the outboard center main groove 3A and the inboard center main groove 3B is preferably formed as a straight groove extending along the circumferential direction of the tire to improve the drainage performance around the tire equator C. In order to further improve the drainage performance of the tread portion 2, groove widths W1a and W1b of the outboard and inboard center main grooves 3A and 3B are preferably in a range of from 4 to 10% of the tread width TW. As shown in FIG. 2, the maximum groove depths D1a and D1b of the outboard and inboard center main grooves 3A and 3B are preferably in a range of from 6 to 10 mm.

In this embodiment, the groove width W1a of the outboard center main groove 3A is larger than the groove width W1b of the inboard center main groove 3B. Therefore, such an outboard center main groove 3A may effectively drain water under the outboard tread portion, and thereby drainage performance may be increased.

Preferably, the groove width ratio W1a/W1b is in a range of from 105 to 120%. when the ratio W1a/W1b is less than 105%, it may be difficult to improve the drainage performance of the tire 1 while maintaining the steering stability. On the contrary, when the ratio W1a/W1b is more than 120%, the steering stability of the tire tends to deteriorate due to the outboard tread portion with small land ratio. More preferably, the groove width ratio W1a/W1b is in a range of from 108 to 115%.

Each of the outboard shoulder main groove 4A and the inboard shoulder main groove 4B is also preferably formed as a straight groove extending along the circumferential direction of the tire to improve the drainage performance. In order to further improve the drainage performance of the tread portion 2, groove widths W1c and W1d of the outboard and inboard shoulder main grooves 4A and 4B are preferably in a range of from 3 to 8% of the tread width TW. As shown in FIG. 2, the maximum groove depths D1c and D1d of the outboard and inboard shoulder main grooves 4A and 4B are preferably in a range of from 6 to 10 mm.

Moreover, the groove width W1c of the outboard shoulder main groove 4A is smaller than groove widths W1a, W1b and W1d of the outboard center main groove 3A, the inboard center main groove 3B and the inboard shoulder main groove 4B. Such an outboard shoulder main groove 4A is useful to increase the land ratio in the outboard tread portion 2, and thereby both the steering stability and uneven wear resistance are improved.

Preferably, the groove width ratio W1c/W1a is in a range of from 30 to 70%. when the ratio W1c/W1a is more than 70%, it may be difficult to obtain the effects described above. On the contrary, when the ratio W1c/W1a is less than 30%, the drainage performance of the tire tends to deteriorate due to the outboard tread portion with small groove volume. More preferably, the groove width ratio W1c/W1a is in a range of from 40 to 60%.

Figure 3:
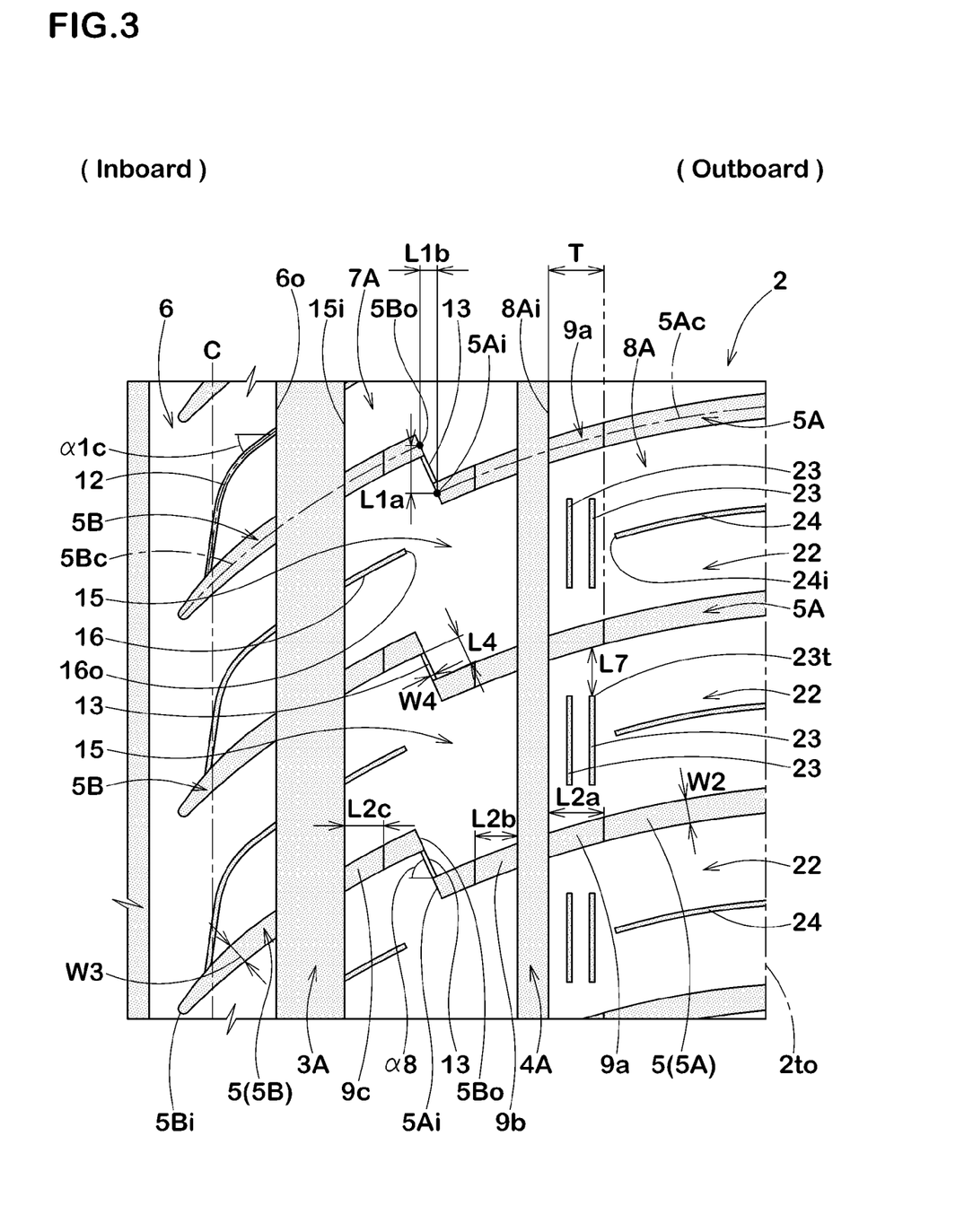
FIG. 3 is a partial enlarged view of an outboard of the tread portion in FIG. 1.

As shown in FIG. 3, lateral grooves 5 include: a plurality of outboard shoulder lateral grooves 5A each of which extends from the outboard tread edge 2to toward the tire equator C beyond the outboard shoulder main groove 4A so as to have axially inner end 5Ai on the outboard middle portion 7A; and a plurality of outboard middle lateral grooves 5B each of which has an outboard end 5Bo on the outboard middle portion 7A and an inboard end 5Bi provided on the inboard side than the tire equator C in the center portion 6.

These outboard shoulder lateral grooves 5A and outboard middle lateral grooves 5B may drain water in between the outboard tread portion and road toward the axially outside of the tire, and thereby the drainage performance may be improved. Preferably, groove widths W2 and W3 of outboard shoulder lateral grooves 5A and outboard middle lateral grooves 5B are in a range of from 1 to 4% of the tread width TW, and groove D2 and D3 depths thereof are preferably in a range of from 6 to 10 mm (shown in FIG. 2).

Each inner end 5Ai of outboard shoulder lateral grooves 5A is provided in different position in the circumferential direction with respect to each outboard end 5Bo of the outboard middle lateral grooves 5B. Moreover, each inner end 5Ai of the outboard shoulder lateral grooves 5A is located in the outboard side than each outboard end 5Bo of the outboard middle lateral groove 5B.

These outboard shoulder lateral grooves 5A and outboard middle lateral grooves 5B maintain the rigidity of the outboard middle portion 7A so that the steering stability is improved. Preferably, the circumferential distance L1a between the inner end 5Ai of the outboard shoulder lateral groove 5A and the outboard end 5Bo of the outboard middle lateral groove 5B is in a range of from 5 to 10 mm, and the axial distance L1b between the inner end 5Ai of the outboard shoulder lateral groove 5A and the outboard end 5Bo of the outboard middle lateral groove 5B is in a range of from 2 to 5 mm. Here, distances L1a and L1b are measured on the basis of groove centerlines 5Ac and 5Bc of lateral grooves 5A and 5B, respectively.

When the distance L1a is less than 5 mm, a land portion between the inner end 5Ai of the outboard shoulder lateral groove 5A and the outboard end 5Bo of the outboard middle lateral groove 5B tends to chip easily due to the low rigidity thereof. On the contrary, when the distance L1a is more than 10 mm, the land portion between the inner end 5Ai of the outboard shoulder lateral groove 5A and the outboard end 5Bo of the outboard middle lateral groove 5B tends to become large, and thereby the drainage performance may decrease. Preferably, the distance L1a is in a range of from 6 to 9 mm, and the distance L1b is in a range of from 3 to 4 mm.

As shown in FIG. 1, each outboard shoulder lateral groove 5A smoothly extends from the outboard tread edge 2to to the axially inner end 5Ai with an angle $\alpha 1a$ of from 0 to 30 with respect to the axial direction of the tire. The angle $\alpha 1a$ is gradually decreasing toward the outboard tread edge 2to.

As shown in FIGS. 2 and 3, at least one of outboard shoulder lateral grooves 5A is provided with tie-bars 9a and 9b in which bottoms 5Ab thereof protrude toward the radially outside of the tire so as to reduce these groove depths D2. These tie-bars 9a and 9b, for example, are disposed in the axially both sides of the outboard shoulder main-groove 4A to improve the rigidity in the side of shoulder main groove 4A of the outboard middle and shoulder portions 7A and 8A, and thereby the steering stability and the uneven wear resistance may be improved. Preferably, axial lengths L2a and L2b of tie-bars 9a and 9b are in a range of from 2 to 14 mm, and heights H2a and H2b thereof are in a range of from 2 to 6 mm.

when axial lengths L2a and L2b of the tie-bars 9a and 9b are less than 2 mm, the effect described above may not be obtained. On the contrary, when axial lengths L2a and L2b of tie-bars 9a and 9b are more than 14 mm, the drainage performance may be decreased due to the decreased groove volume by tie-bars. In this point of view, the lengths L2s and l2b are preferably not less than 5 mm, and preferably not more than 10 mm. Similarly, heights H2a and H2b of the tie-bar 9 are preferably in a range of from 3 to 5 mm.

Preferably, the outboard tie-bar 9a has the height H2a gradually decreasing toward outboard tread edge 2to from the outboard shoulder main groove 4A. Such a tie-bar 9a smoothly changes the rigidity of the outboard shoulder portion 8A in the axial direction of the tire so that the uneven wear resistance, wear resistance and drainage performance are improved.

The outboard shoulder lateral groove 5A has the groove depth D2i at the axially inner end 5Ai larger than the groove depth D2o by the outboard shoulder main groove 4A for maintaining the total groove volume thereof. Accordingly, the drainage performance may be improved.

Preferably, in order to further improve the uneven wear resistance, wear resistance and drainage performance, the depth ratio D2i/D2o of groove depth D2i at the axially inner end 5Ai of the outboard shoulder lateral groove 5A to the groove depth D2o by the outboard shoulder main groove 4A is in a range of from 150 to 200%. more preferably, the depth ratio D2i/D2o is in a range of from 160 to 190%.

Referring to FIG. 1, each outboard middle lateral groove 5B has the angle α1b with respect to the axial direction of the tire gradually decreasing toward the outboard tread edge 2to. The angle α1b of the outboard middle lateral groove 5B may be set larger than the angle α1a of the outboard shoulder lateral groove 5A. Such an outboard middle lateral groove 5B is useful to maintain the rigidity around the tire equator C on the crown portion 6 so that the uneven wear resistance and wear resistance are improved. Preferably, the angle α1b is in a range of from 20 to 50 degrees.

Referring to FIG. 2 and FIG. 3, each middle lateral groove 5B is provided with a tie-bar 9c in which the groove bottom 5Bb thereof protrudes toward the radially outside of the tire so as to reduce the groove depth D3. Each tie-bar 9c adjoins at the axially outside the outboard center main groove 3A. Such a tie-bar 9c is useful to maintain the circumferential rigidity of the outboard middle portion 7A at the axially inner side of the tire so that the uneven wear resistance and wear resistance are improved. Preferably, the axial length L2c and height H2c of the tie-bar 9c may be adjust identically to the axial lengths L2a and L2b, and heights H2a and H2b of the tie-bars 9a and 9b.

The outboard middle lateral groove 5B has the groove width W3 and groove depth D3 each of which is gradually decreasing toward the axially inner end 5Bi from the outboard center main groove 3A to maintain the rigidity near the tire equator C on the center portion 6, and thereby the straight-line stability of the tire is enhanced.

Referring to FIG. 1, the center portion 6 is formed as a rib which straightly extends in the circumferential direction of the tire. Such a center portion 6 has high circumferential rigidity and enhances the straight-line stability of the tire. Preferably, the axial width W3a of the center portion 6 is in a range of from 8 to 15% of the tread width TW.

Referring to an enlarged view of FIG. 3, a plurality of center sipes 12 are provided on the center portion 6. Each center sipe 12 extends from the outboard edge 6o of the center portion 6 to the one of outboard middle lateral grooves 5B so as to have a junction thereto on or near the tire equator C. The center sipe 12 has an angle α1c with respect to the axial direction of the tire gradually increasing toward the tire equator C such that the center sipe is smoothly curved. Such a center sipe 12 may effectively drain water under the center portion 6 while maintaining the rigidity of the center portion.

Referring to FIG. 1, the outboard middle portion 7A has the width W3b larger than that of the inboard middle portion 7B. Such an outboard middle portion 7A is useful to certainly heighten the land ratio of the outboard side in the tread portion 2 so that the steering stability, uneven wear resistance and wear resistance may be improved. Preferably, the ratio W3b/W3c of the width W3b of the outboard middle portion 7A to the width W3c of the inboard middle portion 7B is in a range of from 105 to 130%.

When the ratio W3b/W3c is less than 105%, the effect described above is liable to unsatisfactory. On the contrary, when the ratio W3b/W3c is more than 130%, the land ratio of the inboard side in the tread portion 2 may decrease, the steering stability is liable to deteriorate. Preferably, the ratio W3b/W3c is in a range of from 110 to 120%.

Each of the inner ends 5Ai of the outboard shoulder lateral grooves 5A is provided in different position in the circumferential direction of the tire with respect to each of outboard ends 5Bo of the outboard middle lateral grooves 5B. Moreover, a plurality of outboard middle narrow grooves 13 are provided each of which connects between the inner end 5Ai of the outboard shoulder lateral groove 5A and the outboard end 5Bi of the outboard middle lateral groove 5B. Accordingly, a plurality of the outboard middle blocks 15 are formed in the outboard middle portion 7A by grooves 5A, 5B and 13.

Referring to FIG. 3, each outboard middle narrow groove 13 is inclined to opposite direction with respect to the outboard shoulder lateral grooves 5A and outboard middle lateral grooves 5B. Moreover, the outboard middle narrow groove 13 has the groove width W4 smaller than those of the outboard shoulder lateral grooves 5A and outboard middle lateral grooves 5B. Since a pair of groove walls in the outboard middle narrow groove 13 may easily contact with each other due to the side force when cornering, the circumferentially adjoining outboard middle blocks 15, 15 may engage each other so as to enhance the rigidity of the outboard middle portion 7A. Therefore, the steering stability and uneven wear resistance can be improved while maintaining the drainage performance. Preferably, the length L4 of the outboard middle narrow groove 13 is in a range of from 2 to 7 mm, and the groove width thereof is in a range of from 0.2 to 0.8 mm.

Hence, when the length L4 of the outboard middle narrow groove 13 is less than 2 mm, the engagement of the circumferentially adjoining outboard middle blocks 15, 15 may not be satisfactory. When the length L4 of the outboard middle narrow groove 13 is more than 7 mm, the drainage performance is liable to decrease since each outboard shoulder lateral groove 5A is provided apart from each outboard middle lateral groove 5B. Preferably, the length L4 of the outboard middle narrow groove 13 is in a range of from 0.4 to 0.7 mm.

Preferably, the outboard middle narrow groove 13 has the angle α8 of from 40 to 80 degrees with respect to the axial direction of the tire to further improve the steering stability and wear resistance. More preferably, the angle α8 is in a range of from 50 to 75 degrees.

The outboard middle block 15 is provided with an outboard middle sipe 16 which extends from the inboard edge 15i thereof toward the outboard. The outboard middle sipe 16 has the inboard end which opens at a substantially circumferential center portion of the inboard edge 15i thereof, and the outboard end 16o which terminates on the outboard middle portion 7A. The outboard middle sipe 16 extends with the identical inclination direction of the outboard middle lateral grooves 5B. Such an outboard middle sipe 16 may effectively drain water film under the outboard middle block 15 while maintaining the rigidity the outboard middle block 15.

Referring to FIG. 1, the inboard middle portion 7B is formed as a rib straightly and continuously extending in the circumferential direction of the tire. Such a inboard middle portion 7B may maintain the lateral rigidity even when the axial width W3 thereof is small.

Figure 4:
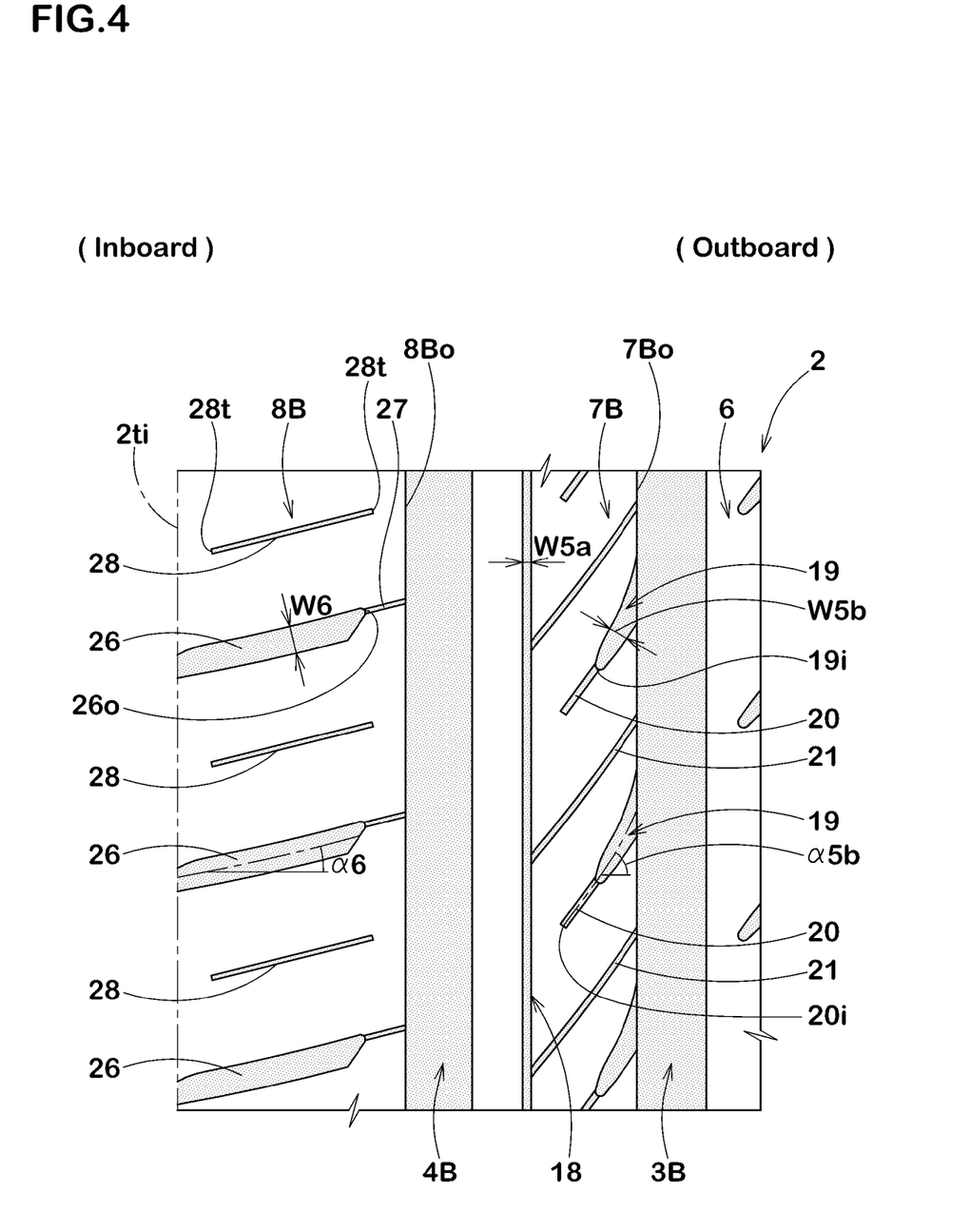
FIG. 4 is a partial enlarged view of an inboard of the tread portion in FIG. 1.

Referring to FIG. 4, the inboard middle portion 7B is provided with: an inboard middle sub-groove 18 straightly extending in the circumferential direction of the tire; a plurality of inboard middle slots 19 which are provided on the outboard edge 7Bo thereof; a plurality of first inboard middle sipes 20 each of which extends with an inclination toward the inboard from the inboard end 19i of the slot 19; and a plurality of second inboard middle sipes 21 each of which is provided in the center portion between the adjacent slots 19, 19 and extends with an inclination toward the inboard from the inboard end 19i.

The inboard middle sub-groove 18 is provided close to the inboard shoulder main groove 4B than the inboard center main groove 3B to improve drain performance. Preferably, the groove width W5a of the inboard middle sub-groove 18 is in a range of from 5 to 10% of the width W3c (shown in FIG. 1) of the inboard middle portion 7B, and groove depth D5a (shown in FIG. 2) is in a range of from 1 to 4 mm.

Each inboard middle slot 19 extends from the outboard end 7Bo of the inboard middle portion 7B having an angle α5b of from 30 to 60 degrees with respect to the axial direction of the tire. The inboard end 19i of the inboard middle slot 19 terminates without reaching the inboard middle sub-groove 18. The groove width W5b and groove depth D5b (shown in FIG. 2) of the inboard middle slot 19 is preferably decreasing toward the inboard end 19i from the outboard edge of the inboard middle portion 7B.

Such an inboard middle slot 19 may drain water under the inboard middle portion 7B into the inboard center main groove 3B to improve wet performance while maintaining the rigidity of the inboard middle portion 7B. Preferably, the groove width W5b of the inboard middle slot 19 is in a range of from 5 to 9 mm, and the groove depth D5b is in a range of from 5 to 9 mm.

Each first inboard middle sipe 20 extends substantially parallel with the inboard middle slot 19 from the inboard end 19i thereof and has the inboard end 20i terminating without reaching the inboard middle sub-groove 18. Such a first inboard middle sipe 20 may be useful to improve the drainage performance while maintaining the rigidity of the inboard middle portion 7B.

Each second inboard middle sipe 21 extends substantially parallel with the inboard middle slot 19 from the inboard end 19i to the inboard middle sub-groove 18. Such a second inboard middle sipe 21 may also be useful to improve the drainage performance while maintaining the rigidity of the inboard middle portion 7B.

Referring to FIG. 1, the outboard shoulder portion 8A has the width W3d larger than the width W3e of the inboard shoulder portion 8B for surely increasing the land ratio of the outboard tread portion 2 so that the steering stability, wear resistance and uneven wear resistance may be enhanced. Preferably, in order to further enhance the actions described above, the width ratio W3d/W3e is in a range of from 101 to 110%, and more preferably in a range of from 103 to 108%.

The outboard shoulder portion 8A is divided into a plurality of outboard shoulder blocks 22 by the outboard shoulder lateral grooves 5A. Referring to FIG. 3, each outboard shoulder block 22 is provided with a longitudinal sipe 23 and an outboard shoulder sipe 24.

The longitudinal sipe 23 has its both ends that are not connected to the outboard shoulder lateral-grooves 5B. Such a longitudinal sipe 23 may soften the rigidity of inboard side in the outboard shoulder portion 8A for improving the uneven wear resistance.

Preferably, the circumferential distance L7 between one end 23t of the longitudinal sipe 23 and the outboard shoulder lateral groove 5A is in a range of from 4 to 9 mm. When the distance L7 is more than 9 mm, it may be difficult to soften the outboard shoulder portion 8A in rigidity. When the distance L7 is less than 4 mm, the rigidity of the outboard shoulder portion 8A is liable to decrease, and thereby the uneven wear tends to be occurred. More preferably, the distance L7 is in a range of from 5 to 8 mm.

In order to improve the uneven wear resistance, the longitudinal sipe 23 is preferably provided within an area T having a width of from 2 to 14 mm from the inboard edge 8Ai of the outboard shoulder portion 8A which is substantially same length L2a of the tie-bar 9a. Preferably, a plurality of longitudinal sipes 23 (two sipes in this embodiment) are provided in the area T. Preferably, three or less longitudinal sipe 23 are provided in each block 22.

Each outboard shoulder sipe 24 extends in parallel with the outboard shoulder lateral-groove 5A from the outboard tread edge 2to toward the inboard substantially to improve the drainage performance.

The outboard shoulder sipe 24 has an axially inner end 24i which does not reach neither the longitudinal sipes 23 nor the outboard shoulder main groove 4A to improve the steering stability, wear resistance and uneven wear resistance.

Referring to FIG. 1, the inboard shoulder portion 8B is formed as a rib which straightly and continuously extends in the circumferential direction of the tire. Such a inboard shoulder portion 8B may have the high lateral rigidity and enhance the steering stability of the tire. Preferably, the axial width W3e of the inboard shoulder portion 8B is in a range of from 11 to 15% of the tread width TW.

Referring to FIG. 1, the inboard shoulder portion 8B is provided with: an inboard shoulder lateral groove 26; a first inboard shoulder sipe 27; and a second inboard shoulder sipe 28.

The inboard shoulder lateral groove 26 extends with an angle α6 of from about 5 to 15 degrees with respect to the axial direction of the tire from the inboard tread edge 2ti toward the outboard. The inboard shoulder lateral groove 26 has an outboard end 26o which does not reach the inboard shoulder main-groove 4B. Moreover, the outboard end 26o of the inboard shoulder lateral groove 26 is tapered.

Such an inboard shoulder lateral groove 26 may effectively drain water under the inboard shoulder portion 8B toward the inboard tread edge 2to to enhance the drayage performance of the tire while maintaining the rigidity of the inboard shoulder portion 8B. Preferably, the groove width W6 of the inboard shoulder lateral groove 26 is in a range of from 1 to 3% of the tread width TW (shown in FIG. 1), and the groove depth D6 (shown in FIG. 2) is in a range of from 6 to 10 mm.

The first inboard shoulder sipe 27 is provided so as to connect between the outboard end 26o of the inboard shoulder lateral groove 26 and the inboard shoulder main groove 4B. The first inboard shoulder sipe 27, for example, extends in parallel with the inboard shoulder lateral groove 26.

The second inboard shoulder sipe 28 is provided in between adjacent the inboard shoulder lateral grooves 26 which extends in parallel with the inboard shoulder lateral groove 26.

Such first and second inboard shoulder sipes 27 are useful to improve the drainage performance of the tire.

The second inboard shoulder sipe 28 has both ends 28t, 28t which do not reach neither the inboard tread edge 2ti nor the inboard shoulder main groove 4B to maintain the rigidity of the inboard shoulder portion 8B.

The present invention is more specifically described and explained by means of the following Examples and References. It is to be understood that the present invention is not limited to these Examples.

Comparison Test

Pneumatic tires with basic tread patterns of FIG. 1 except for details shown in Table 1 were made and tested. Major common specifics and test method are as follows.

Tread width TW: 182 mm
Maximum groove depth D1a, D1b, D1c and D1d of each main groove: 9.5 mm
Outboard shoulder lateral groove
   Groove width W2: 3.8 mm
   Groove depth D2: 7.5 mm
   Angle α1a: 60 to 90 degrees
Outboard middle lateral groove
   Groove width W3: 3.8 mm
   Groove depth D3: 7.5 mm
   Angle α1b: 50 to 70 degrees
Width W3a of Center portion: 11.4 mm Drainage Performance Test:

The test tires (size: 225/55R17) were mounted on wheel rims of 17×7.0JJ with an inner pressure of 230 kPa, and installed in a vehicle (Japanese FR car with a displacement of 4,300 cc) as four wheels. Then, the test car was driven on a wet asphalt road with 5 mm depth of water and suddenly braked at a speed of 60 km/hr so that the ABS worked. The reciprocal number of the braking distance of each tires were measured. The results are shown with an index of 100 representing a value in reference 1. The larger the value, the better the performance.

Wear Resistance Test:

The test tires (size: 195/65R15) were mounted on wheel rims of 15×6.0JJ with an inner pressure of 230 kPa, and installed in a vehicle (Japanese FR car with a displacement of 2,000 cc) as four wheels. The test car was driven on a dry asphalt road for 8,000 km, and then the groove depths left in each inboard center main groove and outboard center main groove of tires were measured. The groove depths were measured at three points in tire circumferential direction in each groove, and the average groove depth in each groove was evaluated. The results are shown with an index of 100 representing a value in reference 1. The larger the value, the better the performance.

Uneven Wear Performance Test:

The test tires (size: 195/65R15) were mounted on wheel rims of 15×6.0JJ with an inner pressure of 230 kPa, and installed in a vehicle (Japanese FR car with a displacement of 2,000 cc) as four wheels. The test car was driven on a dry asphalt road for 8,000 km, and then the difference of wear amounts between the axially inner and outer edges in each of the outboard middle portion and outboard shoulder portion were measured at three points in tire circumferential direction in each groove. The reciprocal numbers of average differences were evaluated. The results are shown with an index of 100 representing a value in reference 1. The larger the value, the better the performance.

Steering Stability Test:

The test tires (size: 225/55R17) were mounted on wheel rims of 17×7.0JJ with an inner pressure of 230 kPa, and installed in a vehicle (Japanese FR car with a displacement of 4,300 cc) as four wheels. Then, a test driver drove the test car on a test course having a dry asphalt road, and evaluated steering stability such as the steering response during cornering, stiffness and cornering grip. The results are shown with a score of 100 representing a value in reference 1. The larger the value, the better the performance.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Groove width W1a(mm) | 10.7 | 11.4 | 11.4 | 10.9 | 11.4 | 11.4 | 11.4 | 11.4 | 11.4 | 11.4 |
| Groove width W1b(mm) | 11.1 | 10.4 | 10.4 | 10.4 | 9.5 | 10.4 | 10.4 | 10.4 | 10.4 | 10.4 |
| Groove width W1c(mm) | 5.7 | 5.7 | 5.7 | 3.2 | 8 | 5.7 | 5.7 | 5.7 | 5.7 | 5.7 |
| Groove width W1d(mm) | 9.5 | 9.5 | 9.5 | 9.5 | 9.5 | 9.5 | 9.5 | 9.5 | 9.5 | 9.5 |
| Ratio W1a/W1b (%) | 96.4 | 109.6 | 109.6 | 104.8 | 120 | 109.6 | 109.6 | 109.6 | 109.6 | 109.6 |
| Ratio W1c/W1a (%) | 53.3 | 50 | 50 | 29.4 | 70.2 | 50 | 50 | 50 | 50 | 50 |
| Width of outboard middle portion W3b(mm) | 26.1 | 28.4 | 28.4 | 28.4 | 28.4 | 27.1 | 31.8 | 28.4 | 28.4 | 28.4 |
| Width of inboard middle portion W3c(mm) | 26.9 | 24.6 | 24.6 | 24.6 | 24.6 | 25.9 | 24.6 | 24.6 | 24.6 | 24.6 |
| Width of outboard shoulder portion W3d(mm) | 35 | 36 | 36 | 36 | 36 | 35.7 | 37.2 | 36 | 36 | 36 |
| Width of inboard shoulder portion W3e(mm) | 36.1 | 35.1 | 35.1 | 35.1 | 35.1 | 35.4 | 33.9 | 35.1 | 35.1 | 35.1 |
| Ratio W3b/W3c (%) | 97 | 115.4 | 115.4 | 115.4 | 115.4 | 104.6 | 129.3 | 115.4 | 115.4 | 115.4 |
| Ratio W3d/W3e (%) | 97 | 102.6 | 102.6 | 102.6 | 102.6 | 100.8 | 109.7 | 102.6 | 102.6 | 102.6 |
| Outboard middle narrow groove | Presence | Absence | Presence | Presence | Presence | Presence | Presence | Presence | Presence | Presence |
| Length of outboard middle narrow groove L4(mm) | 4.7 | — | 4.7 | 4.7 | 4.7 | 4.7 | 4.7 | 2 | 7 | 4.7 |

TABLE 1-continued

|  |  |  |  |  |  |  |  |  |  |
|---|---|---|---|---|---|---|---|---|---|
| Groove width of outboard middle narrow groove W4(mm) | 0.5 | — | 0.5 | 0.5 | 0.5 | 0.5 | 0.5 | 0.8 | 0.2 | 0.5 |
| Angle of outboard middle narrow groove a8(deg.) | 70 | — | 70 | 70 | 70 | 70 | 70 | 70 | 70 | 70 |
| Tie-bars | Absence | Absence | Presence | Presence | Presence | Presence | Presence | Presence | Presence | Absence |
| Length of tie-bars L2a, L2b, L2c (mm) | — | — | 7.6 | 7.6 | 7.6 | 7.6 | 7.6 | 7.6 | 7.6 | — |
| height of tie-bars H2a, H2b, H2c (mm) | 4 | — | 4 | 4 | 4 | 4 | 4 | 4 | 4 | — |
| Number of longitudinal sipes | 2 | 2 | 2 | 2 | 2 | 2 | 2 | 2 | 2 | 2 |
| Groove depth of outboard shoulder lateral groove D2i(mm) | 7.5 | 7.5 | 7.5 | 7.5 | 7.5 | 7.5 | 7.5 | 7.5 | 7.5 | 7.5 |
| Groove depth of outboard shoulder lateral groove D2o(mm) | 7.5 | 7.5 | 4.3 | 4.3 | 4.3 | 4.3 | 4.3 | 4.3 | 4.3 | 4.3 |
| Ratio D2i/D2o (%) | 100 | 100 | 174.4 | 174.4 | 174.4 | 174.4 | 174.4 | 174.4 | 174.4 | 174.4 |
| Drainage performance (Index) | 100 | 100 | 100 | 95 | 100 | 100 | 100 | 105 | 90 | 110 |
| Wear resistance (Index) | 100 | 110 | 110 | 110 | 105 | 105 | 110 | 110 | 110 | 100 |
| Uneven wear resistance (Index) | 100 | 95 | 105 | 105 | 105 | 100 | 105 | 100 | 105 | 95 |
| Steering stability (Index) | 100 | 105 | 115 | 115 | 110 | 110 | 105 | 105 | 115 | 110 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Groove width W1a(mm) | 11.4 | 11.4 | 11.4 | 11.4 | 11.4 | 11.4 | 11.4 | 11.4 |
| Groove width W1b(mm) | 10.4 | 10.4 | 10.4 | 10.4 | 10.4 | 10.4 | 10.4 | 10.4 |
| Groove width W1c(mm) | 5.7 | 5.7 | 5.7 | 5.7 | 5.7 | 5.7 | 5.7 | 5.7 |
| Groove width W1d(mm) | 9.5 | 9.5 | 9.5 | 9.5 | 9.5 | 9.5 | 9.5 | 9.5 |
| Ratio W1a/W1b (%) | 109.6 | 109.6 | 109.6 | 109.6 | 109.6 | 109.6 | 109.6 | 109.6 |
| Ratio W1c/W1a (%) | 50 | 50 | 50 | 50 | 50 | 50 | 50 | 50 |
| Width of outboard middle portion W3b(mm) | 28.4 | 28.4 | 28.4 | 28.4 | 28.4 | 28.4 | 28.4 | 28.4 |
| Width of inboard middle portion W3c(mm) | 24.6 | 24.6 | 24.6 | 24.6 | 24.6 | 24.6 | 24.6 | 24.6 |
| Width of outboard shoulder portion W3d(mm) | 36 | 36 | 36 | 36 | 36 | 36 | 36 | 36 |
| Width of inboard shoulder portion W3e(mm) | 35.1 | 35.1 | 35.1 | 35.1 | 35.1 | 35.1 | 35.1 | 35.1 |
| Ratio W3b/W3c (%) | 115.4 | 115.4 | 115.4 | 115.4 | 115.4 | 115.4 | 115.4 | 115.4 |
| Ratio W3d/W3e (%) | 102.6 | 102.6 | 102.6 | 102.6 | 102.6 | 102.6 | 102.6 | 102.6 |
| Outboard middle narrow groove | Presence | Presence | Presence | Presence | Presence | Presence | Presence | Presence |
| Length of outboard middle narrow groove L4(mm) | 4.7 | 4.7 | 4.7 | 4.7 | 4.7 | 4.7 | 4.7 | 4.7 |
| Groove width of outboard middle narrow groove W4(mm) | 0.5 | 0.5 | 0.5 | 0.5 | 0.5 | 0.5 | 0.5 | 0.5 |
| Angle of outboard middle narrow groove a8(deg.) | 70 | — | 70 | 70 | 70 | 70 | 40 | 80 |
| Tie-bars | Presence | Presence | Presence | Presence | Presence | Presence | Presence | Presence |
| Length of tie-bars L2a, L2b, L2c (mm) | 2 | 14 | 7.6 | 7.6 | 7.6 | 7.6 | 7.6 | 7.6 |
| height of tie-bars H2a, H2b, H2c (mm) | 2 | 6 | 4 | 4 | 4 | 4 | 4 | 4 |
| Number of longitudinal sipes | 2 | 2 | 1 | 4 | 2 | 2 | 2 | 2 |
| Groove depth of outboard shoulder lateral groove D2i(mm) | 7.5 | 7.5 | 7.5 | 7.5 | 7.5 | 7.5 | 7.5 | 7.5 |
| Groove depth of outboard shoulder lateral groove D2o(mm) | 4.3 | 4.3 | 4.3 | 4.3 | 5 | 3.8 | 4.3 | 4.3 |
| Ratio D2i/D2o (%) | 174.4 | 174.4 | 174.4 | 174.4 | 150 | 197.4 | 174.4 | 174.4 |
| Drainage performance (Index) | 105 | 90 | 100 | 100 | 90 | 105 | 105 | 95 |
| Wear resistance (Index) | 105 | 110 | 110 | 110 | 110 | 105 | 110 | 110 |
| Uneven wear resistance (Index) | 100 | 110 | 100 | 110 | 110 | 100 | 100 | 105 |
| Steering stability (Index) | 110 | 120 | 115 | 100 | 115 | 115 | 110 | 110 |

From the test results, it was confirmed that example tires in accordance with the present invention can be effectively improved the steering stability and wear resistance while maintaining the drainage performance compared to references.

The invention claimed is:

1. A pneumatic tire having a specified installing direction to a vehicle, the tire comprising:
   a tread portion having an inboard tread edge and an outboard tread edge;
   a pair of circumferentially extending inboard and outboard center main grooves disposed on both sides of a tire equator to define a center portion therebetween;
   a pair of circumferentially extending inboard and outboard shoulder main grooves disposed axially outside of the inboard and outboard center main grooves;
   a pair of middle portions which include an inboard middle portion defined between the inboard center main groove and the inboard shoulder main groove and an outboard middle portion defined between the outboard center main groove and the outboard shoulder main groove;
   a pair of shoulder portions which include an inboard shoulder portion defined the axially outside of the inboard shoulder main groove and an outboard shoulder portion defined the axially outside of the outboard shoulder main groove;
   the outboard shoulder main groove having a groove width smaller than those of the inboard shoulder main groove and center main grooves;
   the outboard middle portion having a width larger than that of the inboard middle portion;
   a plurality of outboard shoulder lateral grooves each of which extends from the outboard tread edge toward the tire equator beyond the outboard shoulder main groove without reaching the outboard center groove so as to have an axially inner end within the outboard middle portion, wherein each of the outboard shoulder lateral grooves is inclined with respect to an axial direction of the tire;
   a plurality of outboard middle lateral grooves each of which has an outboard end on the outboard middle portion without reaching the outboard shoulder main groove and an inboard end on the center portion;
   each said inner end of the outboard shoulder lateral groove provided in a different position in the circumferential direction of the tire with respect to each said outboard end of the outboard middle lateral groove; and
   a plurality of outboard middle narrow grooves each of which has a groove width smaller than those of said lateral grooves and connects between the inner end of the outboard shoulder lateral groove and the outboard end of the outboard middle lateral groove, wherein the outboard middle narrow grooves are inclined in opposite direction to the outboard shoulder lateral grooves.

2. The tire according to claim 1, wherein each said outboard middle narrow groove has a length in a range of from 2 to 7 mm.

3. The tire according to claim 1 wherein at least one of said outboard shoulder lateral grooves is provided with a tie-bar where a bottom thereof protrudes toward the radially outside of the tire so as to reduce its groove depth.

4. The tire according to claim 3, wherein the tie-bar is provided by the side of the outboard shoulder main groove.

5. The tire according to claim 3, wherein the tie-bar has an axial length in a range of from 2 to 14 mm.

6. The tire according to claim 1, wherein the outboard shoulder portion comprises a plurality of outboard shoulder blocks, each of the outboard should blocks is provided with a plurality of circumferentially extending longitudinal sipes, and each of the longitudinal sipes has both ends without reaching said outboard shoulder lateral grooves.

7. The tire according to claim 6, wherein said longitudinal sipes are provided by the side of the outboard shoulder main groove.

8. The tire according to claim 6, wherein said longitudinal sipes extend in parallel with each other.

9. The tire according to claim 6, wherein said longitudinal sipe is separated in a range of from 2 to 14 mm from an axially inner edge of the outboard shoulder portion.

10. The tire according to claim 1, wherein said outboard shoulder lateral grooves have groove depths, and said groove depths at inner ends are larger than those of the side of outboard shoulder main groove in the outboard middle portion.

11. The tire according to claim 1, wherein each said outboard middle narrow groove has a groove width in a range of from 0.2 to 0.8 mm.

12. The tire according to claim 1, wherein each of the outboard shoulder lateral grooves has an angle with respect to the axial direction of the tire, and the angle is gradually decreasing toward the outboard tread edge.

13. The tire according to claim 1, wherein each of the outboard middle lateral grooves has an angle with respect to the axial direction of the tire, and the angle is gradually decreasing toward the outboard tread edge.

14. The pneumatic tire of claim 1, wherein the groove widths of the outboard and inboard center main grooves are in the range of 4 to 10% of the tread width.

15. The pneumatic tire of claim 1, wherein the groove width of the outboard center main groove is larger than the groove width of the inboard center main groove.

16. The pneumatic tire of claim 15, wherein the groove width ratio of the outboard center main groove to the inboard center main groove is 105 to 120%.

17. The pneumatic tire of claim 1 wherein the groove widths of the outboard and inboard shoulder main grooves are 3 to 8% of the tread width.

18. The pneumatic tire of claim 1, wherein the groove width of the outboard shoulder main groove is smaller than the groove widths of the outboard center main groove, the inboard, center main groove, and the inboard shoulder main groove.

19. The pneumatic tire of claim 1, wherein the ratio of the shoulder main outboard groove to the center outboard groove is in the range of 30 to 70%.

20. The pneumatic tire of claim 1, wherein the groove widths of the outboard shoulder lateral grooves and the outboard middle lateral grooves are in the range of from 1 to 4% of the tread width.

* * * * *